(12) United States Patent
Arimatsu

(10) Patent No.: US 9,413,199 B2
(45) Date of Patent: Aug. 9, 2016

(54) ROTOR OF ELECTRIC MOTOR WITH MAGNET HOLDING STRUCTURE AND ELECTRIC MOTOR INCLUDING THE ROTOR

(71) Applicant: FANUC CORPORATION, Yamanashi (JP)

(72) Inventor: Yohei Arimatsu, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 47 days.

(21) Appl. No.: 14/583,340

(22) Filed: Dec. 26, 2014

(65) Prior Publication Data

US 2015/0188369 A1    Jul. 2, 2015

(30) Foreign Application Priority Data

Dec. 27, 2013  (JP) .................................. 2013-271619
Nov. 7, 2014    (JP) .................................. 2014-227233

(51) Int. Cl.
*H02K 1/28*    (2006.01)
*H02K 1/27*    (2006.01)

(52) U.S. Cl.
CPC . *H02K 1/28* (2013.01); *H02K 1/278* (2013.01)

(58) Field of Classification Search
CPC ................................. H02K 1/28; H02K 1/278
See application file for complete search history.

(56) References Cited

U.S. PATENT DOCUMENTS

| 8,040,007 | B2 * | 10/2011 | Petrov | ...................... | H02K 1/02 310/156.27 |
| 2008/0088195 | A1 * | 4/2008 | Dooley | ................ | H02K 1/2786 310/156.26 |
| 2008/0238234 | A1 * | 10/2008 | Saban | .................... | H02K 1/278 310/156.28 |

FOREIGN PATENT DOCUMENTS

| JP | H06060735 | U | 8/1994 |
| JP | H07020051 | U | 4/1995 |
| JP | H09149572 | A | 6/1997 |
| JP | 1189142 | A | 3/1999 |
| JP | 2013169103 | A | 8/2013 |
| JP | 2013188075 | A | 9/2013 |

OTHER PUBLICATIONS

English Translation of Japanese Publication No. 2013188075, published Sep. 19, 2013, 8 pages.
English Translation of Claims, Detailed Description, Description of Drawings and Drawings for Japanese Publication No. H06060735, published Aug. 23, 1994, 8 pages.
English Translation of Abstract for Japanese Publication No. H09149572, published Jun. 6, 1997, 1 page.
English Translation of Abstract for Japanese Publication No. H07020051, published Apr. 7, 1995, 1 page.
English abstract for Japanese Publication No. JP11-089142 published Mar. 30, 1999, 1 page.
English abstract for Japanese Publication No. JP2013-169103 published Aug. 29, 2013, 1 page.

* cited by examiner

*Primary Examiner* — Dang Le
(74) *Attorney, Agent, or Firm* — Fredrikson & Byron, P.A.

(57) ABSTRACT

A rotor of an electric motor includes a plurality of magnets arranged in a circumferential direction. The rotor includes a holding member mounted concentrically with the rotor and on a radially outside of the magnets so as to hold the magnets. The holding member includes a plurality of tubular members having different diameters and being arranged concentrically with one another. The respective tubular members have expanded diameters, and therefore, compressive holding force acts on the magnets from the holding member, as a result of elastic restorative force. The tubular members include tubular members having different mechanical properties.

6 Claims, 5 Drawing Sheets

ROTOR OF ELECTRIC MOTOR WITH MAGNET HOLDING STRUCTURE AND ELECTRIC MOTOR INCLUDING THE ROTOR

BACKGROUND OF THE INVENTION

1. Field of the Invention

The present invention relates to a rotor including a magnetic holding structure and an electric motor including the rotor.

2. Description of the Related Art

A known synchronous electric motor includes a rotor having a plurality of magnets arranged on a surface thereof in a circumferential direction. When a higher speed of rotation is desired in this type of electric motor, it is necessary to provide sufficiently high holding strength for holding the magnets, in order to prevent the magnets from being detached from the rotor due to centrifugal force.

JP-A-11-089142 discloses a rotor of an electric motor, which includes a rotational axis, a sleeve provided in an outer circumference of the rotational axis, a cylindrical permanent magnet provided on an outer circumference of the sleeve, and a holding member made of carbon-fiber-reinforced plastic and provided on an outer circumference of the permanent magnet, so as to cover the permanent magnet.

JP-A-2013-169103 discloses a rotor of an electric motor, which includes a cylindrical protective tube provided so as to surround a plurality of magnets. The protective tube is attached to the rotor so as to have an increased diameter with filling pressure of resin, and therefore the protective tube is pressed against the magnets on a radially inside due to restorative force of the protective tube. According to this related art, the magnets can be held in position without an adhesive.

In order to rotate a rotor at a high speed, even greater holding strength on the magnets is necessary. For example, when adopting the holding member made of carbon-fiber-reinforced plastic as disclosed in JP-A-11-089142, the holding strength can be increased by thickening the holding member. However, since stress is generated concentrically on an inner diameter side, simply increasing the thickness of the holding member is not effective. In addition, when a thickened holding member is adopted, a distance between the magnets of the rotor and the stator (magnetic gap) becomes greater, resulting in the decreased torque. Further, it is expensive and a high level of skill is necessary to form a thickened fiber-reinforced plastic member, possibly causing defects in the internal structure and impairing the holding strength.

In order to improve the function of holding the magnets, an interference of the holding member may be increased so as to increase an amount of extension in the circumferential direction. However, if in particular, the holding member is made of FRP formed from a sheet-like material wound around a cylindrical jig, a terminal end portion of the sheet material or a portion nearby may not be able to extend enough that these portions may get loose or come off from the holding member, impairing the reliability of the rotor. In addition, as a result of increasing the interference of the holding member, great restorative force acts on the holding member, a fiber on an outer circumferential side may get into a gap between fibers on an inner circumferential side, and therefore the intended holding strength may be lost.

According to a known art, the magnets and the protective pipe are held by the internal pressure of a filing material as disclosed in JP-A-2013-169103. In this case, a filling material is thermoplastic resin injected by injection molding. The internal pressure generated by the resin is small enough relative to tensile strength of the resin that the resin is not deformed. In other words, this known art can be only applied to the case where it is only necessary to provide fixing force which can be borne by plastic. If the rotor having such a structure is operated at high speed, the following problems arise. (1) The protective tube is expanded due to centrifugal force corresponding to the own weight of the protective tube, but the filling material cannot follow the expansion of the protective tube after reaching a certain limit. As a result, the fixing force acting on the protective tube is lost, and the protective tube starts to run idle. The protective tube scrapes the filling material with its inner wall, and is eventually detached from the rotor with noise. (2) As compared to the centrifugal force corresponding to the weight of the magnets having comparable density to iron, the fixing force by the filling material of resin is very weak, and may not be enough to fix the magnets against the centrifugal force. Therefore, when the rotor reaches a certain rotational speed, the magnets start to move to a radially outside and in a rotational direction, running idle and destroying the filling material. Accordingly, the structure disclosed in JP-A-2013-169103 is not appropriate to increase rotational speed.

Therefore, there is a need for a rotor which can increase efficiency and reliability of an electric motor.

SUMMARY OF THE INVENTION

According to a first aspect, a rotor of an electric motor comprising a plurality of magnets arranged in a circumferential direction, the rotor further comprising a holding member provided concentrically with the rotor on a radially outside of the plurality of magnets so as to hold the plurality of magnets, the holding member including a plurality of tubular members arranged concentrically with one another and having diameters different from one another, the respective tubular members having expanded diameters such that compressive holding force acts on the magnets radially inwardly, as a result of elastic restorative force of the holding member, is provided.

According to a second aspect, in the rotor according to the first aspect, any two tubular members of the plurality of tubular members which are adjacent to each other in a radial direction are configured such that one of the two tubular members has an interference equal to or larger than that of the other tubular member situated on a radially outside.

According to a third aspect, in the rotor according to the first or second aspect, the plurality of tubular members include one or more tubular members having different mechanical properties from other tubular members.

According to a fourth aspect, in the rotor according to the third aspect, any two tubular members of the plurality of tubular members which are adjacent to each other in a radial direction are configured such that one of the two tubular members has an elastic modulus equal to or smaller than that of the other tubular member situated on a radially outside.

According to a fifth aspect, in the rotor according to the third or fourth aspect, a tubular member of the plurality of tubular members which is situated on an innermost position in a radial direction has tensile strength higher than any other tubular members.

According to a sixth aspect, in the rotor according to any one of the first to fifth aspects, at least one of the plurality of tubular members includes fiber-reinforced resin configured such that fiber at least extends in a circumferential direction.

According to a seventh aspect, in the rotor according any one of the first to sixth aspects, at least two of the plurality of tubular members are made of fiber-reinforced resin in which fibers extend in a circumferential direction, the tubular members being arranged such that matrix resin of the fiber-reinforced resin of the tubular member on a radially inside has a greater Izod impact value than that of the tubular member on a radially outside.

According to an eighth aspect, in the rotor according to any one of the first to seventh aspects, at least a tubular member of the plurality of tubular members which is situated on an outermost position in a radial direction has a cylindrical shape prior to assembly.

According to a ninth aspect, an electric motor comprising the rotor according to any one of the first to eighth aspects is provided.

These and other objects, features and advantages of the present invention will become more apparent in light of the detailed description of exemplary embodiments thereof as illustrated by the drawings.

DETAILED DESCRIPTION OF THE INVENTION

Embodiments of the present invention will be described below with reference to the accompanying drawings. Constituent elements of the illustrated embodiment may be modified in size in relation to one another for better understanding of the present invention.

Figure 1:
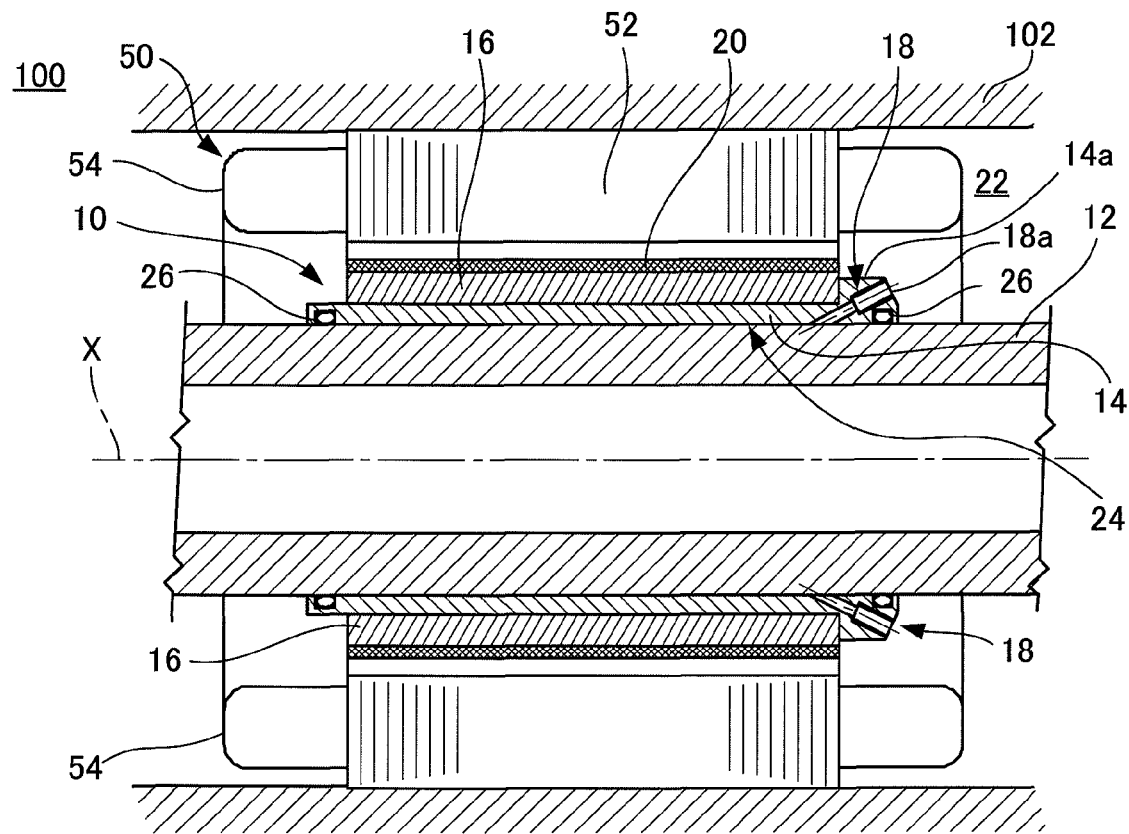
FIG. 1 is a longitudinal sectional view illustrating an electric motor according to one embodiment of the present invention.

FIG. 1 is a longitudinal sectional view illustrating an electric motor 100 according to one embodiment of the present invention. The electric motor 100 is, for example, a surface permanent magnet motor (SPM electric motor) in which magnets are mounted on a surface of the rotor. The electric motor 100 includes a rotor 10 and a stator 50 provided concentrically with each other. The electric motor 100 is designed to generate rotational power as a result of a magnetic interaction between the rotor 10 and the stator 50.

The stator 50 includes a cylindrical iron core 52 formed with slots (not shown) extending parallel to an axial direction, and coils 54 wound through the slots. The stator 50 is fixed to a housing 102 of the electric motor 100 surrounding the stator 50. During operation of the electric motor 100, a three-phase alternating current is supplied to the coils 54 to generate a rotational magnetic field around the rotor 10, for example.

The rotor 10 includes a sleeve 14 fitted by, for example, interference fit on an outer circumference of a cylindrical rotational axis 12 coupled to, for example, a spindle of a machine tool, and a plurality of magnets arranged on an outer circumference of the sleeve 14, and a holding member 20 mounted on an outer circumference of the magnets 16 so as to hold the magnets 16. The rotational axis 12 is rotatably supported by a bearing, which is not shown, around a rotational axis line X during the operation of the electric motor 100. The sleeve 14, the magnets 16 and the holding member 20 of the rotor 10 are designed to rotate together with the rotational axis 12.

The sleeve 14 has a flange 14a protruding radially outwardly in a stepwise manner at one end of the sleeve 14. The flange 14a is formed with a fluid channel 18 communicating the exterior 22 of the rotor 10 with a gap 24 between the inner circumferential face of the sleeve 14 and the outer circumferential face of the rotational axis 12. The fluid channel 18 is formed with a threaded hole 18a opening to the exterior 22. The sleeve 14 is also formed with an annular groove at both ends of the sleeve in the axial direction, and a sealing member 26 such as O-ring is mounted in the annular groove.

In the present specification, "radially outwardly" means a direction away from the rotational axis line X in the cross-section, "radially inwardly" means a direction toward the rotational axis line X in the cross-section, and "the axial direction" means a direction parallel to the rotational axis line X.

In this embodiment, the rotor 10 is attached to the rotational axis 12 by oil pressure fitting. Accordingly, the diameter of the rotor 10 is expanded due to oil pressure provided in the gap 24 between the sleeve 14 and the rotational axis 12 through the fluid channels 18 arranged in a circumferential direction of the sleeve 14 and spaced apart from each other. During this process, a supply nozzle for supplying the oil is screwed into the threaded hole 18a. At least one fluid channel is used as an air hole.

The oil introduced to the gap 24 is sealed by the sealing member 26 provided on opposite ends of the sleeve 14 so as not to leak to the exterior 22 of the rotor 10. The oil also lubricates the contact face between the inner circumferential face of the sleeve 14 and the outer circumferential face of the rotational axis 12. This facilitates sliding of the sleeve 14 in the axial direction to a predetermined position relative to the rotational axis 12.

The inner circumferential face of the sleeve 14 and a portion of the outer circumferential face of the rotational axis 12 which receives the sleeve 14 may have a tapered face designed so as to have a gradually decreased diameter from one end to the other. In this case, the sleeve 14 and the rotational axis 12 are sided such that the sleeve 14 is moved from the smaller diameter side to the larger diameter side of the rotational axis 12, and a predetermined interference is obtained when the sleeve 14 reaches at a predetermined position.

The magnet 16 includes a plurality of permanent magnets arranged on the outer circumferential face of the sleeve 14 in the circumferential direction. For example, the respective permanent magnets of the magnet 16 have a bar-like shape and are formed separately from one another. Alternatively, the magnet 16 may be a cylindrical magnet formed from a plurality of arrays of permanent magnets integrally formed with one another with resin.

As further described below, the holding member 20 is formed by concentrically attaching a plurality of tubular members having diameters different from one another to the rotor 10. The respective tubular members are attached to the rotor 10 with the increased diameters in accordance with a predetermined interference. This allows the tubular members to provide sufficient restorative force on the magnets 16 radially inwardly, so as to hold the magnets 16 against centrifugal force generated when the rotor 10 is in rotational motion. As the rotational speed of the rotor increases, the greater restorative force is necessary. In this connection, as the interference of the tubular members is increased, the restorative force becomes greater. Accordingly, the interferences of the tubular members are determined correspondingly to the necessary restorative force, depending on the rotational speed of the rotor.

The respective tubular members are tubes made of non-magnetic metal, for example. The tubular members may be made of titanium alloy or stainless steel. In addition to the property inherent to the material, the mechanical properties of the respective tubular members may be modified by an additional thermal process, or adjustment of the thickness.

Alternatively, the tubular members may be made of fiber-reinforced plastic (hereinafter referred to as "FRP"), which is formed from a number of fibers integrated with one another by resin serving as a binder. For example, the tubular member may be formed into a predetermined shape corresponding to an outer shape of a jig, by winding a prepreg sheet around the jig, and then heating resin to harden. The FRP used for the tubular member may be a material having high specific strength (tensile strength per unit density), such as carbon fiber, glass fiber, aramid fiber, silicon carbide fiber, boron fiber, titanium alloy fiber, ultrahigh molecular weight polyethylene, and polybutylene terephthalate fiber, or the like.

The tubular members may include tubular members having different mechanical properties. For example, an inner tubular member provided on a radially inside has the following feature, as compared to any other tubular members provided on a radially outside relative to the inner tubular member. The inner tubular member is made of a material having sufficiently high tensile strength in the circumferential direction, radial direction and axial direction, respectively. For example, the inner tubular member is formed from a thin tube made of non-magnetic metal. In an alternative case in which the inner tubular member is made of FRP, a ratio of fiber is increased in any direction, except for the circumferential direction. The FRP of the inner tubular member may include different kinds of fibers combined together. In any case, the material of high tensile strength may be adopted.

Alternatively, in the case where at least two tubular members are made of FRP in which fibers extend in a circumferential direction, a tubular member on a radially inside is configured to include matrix resin having a greater Izod impact value than that of a tubular member on a radially outside, or in other words, configured to have higher resistance to breakage. "Fibers extending in a circumferential direction" means that fibers are wound so as to extend in a direction perpendicular to the axial direction of the tubular member, or alternatively, in a direction at an angle within a predetermined range relative to the direction perpendicular to the axial direction.

On the other hand, a tubular member in the intermediate position in the radial direction may be made of a material having an elastic modulus in the circumferential direction, which is larger than that of the tubular member on the radially inside. For example, if the tubular member in the intermediate position is made of FRP, a ratio of the fiber extending in the circumferential direction is increased. Alternatively, a fiber having such a property may be selected. Further, an outer tubular member provided on the radially outside of the tubular member in the intermediate position is made of a material having a larger elastic modulus in the circumferential direction, so as to have a smaller amount of expansion, for example. This allows an extension amount of the outermost tubular member to be small, and as a result, the outer tubular member provided on the outermost layer of the holding member can be prevented from coming off or getting loose at the terminal end portions thereof formed by winding the sheet material to form the FRP. In addition to these effects, in the case where the greater strength against the external force is necessary, for example, in order to protect the surface of the rotor, the outermost tubular member may be a thin tube made of non-magnetic metal.

When the intermediate tubular member is interposed between the inner tubular member and the outer tubular member, the intermediate tubular member is unlikely to be subject to the external force since it is sandwiched by other tubular members on the inner side and the outer side. Therefore, the intermediate tubular member is designed so as to mainly increase the elasticity in the circumferential direction in order to hold the magnets, for example. For this purpose, the material of the intermediate tubular member may be selected by taking into account the elasticity in the circumferential direction. For example, the material of the intermediate tubular member is selected such that the elastic modulus of the intermediate tubular member in the circumferential direction is equal to or larger than that of the inner tubular member and smaller than that of the outer tubular member, and that the interference of the intermediate tubular member is equal to or smaller than that of the inner tubular member and larger than that of the outer tubular member.

Of the plurality of tubular members, any two tubular members adjacent to each other in the radial direction may be designed such that one of the tubular members has an interference equal to or larger than that of the other tubular member provided on the radially outside.

The interference of the tubular member may be defined as the increased amount of the diameter of the tubular member attached to the rotor in comparison with the diameter of the tubular member prior to the attachment to the rotor, or in other words, a variant in the diameters before and after the attachment. In the case of the tubular member having a non-circular shape, in which the diameter cannot be directly obtained, an imaginary circle is defined such that the diameter has the same length as the circumferential length of the tubular member in the cross-section. Then, the changes in the diameters of the imaginary circle are calculated to obtain the interference of the tubular member.

Of the plurality of tubular members, for any two tubular members adjacent to each other in the radial direction, materials may be selected such that one of the tubular members has an elastic modulus in the circumferential direction equal to or smaller than that of the other tubular member provided on the radially outside. For example, metal or FRP may be selected for the respective tubular members as necessary, or alternatively, the extending direction of the fibers may be adjusted as necessary, so as to satisfy the above-described relationship of the elastic modulus in the circumferential direction.

In the case where at least two tubular members are made of FRP in which fibers extend in a circumferential direction, a tubular member on a radially inside stretches to a greater extent than a tubular member on a radially outside. Therefore, the matrix resin of the tubular member on a radially inside may be configured to have a greater Izod impact value, or in other words, to have higher resistance to breakage.

In addition, of the plurality of tubular members forming the holding member, the innermost tubular member in the radial direction may be designed so as to have tensile strength higher than any other tubular members. For example, the innermost tubular member may be made of FRP, in which a ratio of the fiber extending in the circumferential direction is maximized, or made of non-magnetic metal material having high tensile strength.

Each tubular member may have a cylindrical shape before attached to the rotor. The tubular member in this case has a cylindrical shape when no external force acts thereon. The "cylindrical shape" means a substantially circular shape in cross-section. The tubular member having a cylindrical shape is advantageously easy to form, and therefore, inexpensive to manufacture. In addition, it is easy to produce a cylindrical tubular member having a uniform thickness and strength, which contributes to a stable quality and performance. In particular, in the case where the tubular member is made of FRP in which fibers extend in a circumferential direction, it is advantageous that a cylindrical tubular member tends not to cause defects such as strain in fibers. On the other hand, a tubular member on the innermost side in a radial direction may have a non-cylindrical shape and conform to an outer edge of the magnets so as to reduce stress concentration.

The holding member made of a plurality of tubular members having the above-described features has the following advantages.

(1) Since the holding member for holding the magnets of the rotor has a multi-layer construction of a plurality of tubular members, stress can be distributed to the respective tubular members, as opposed to the conventional art in which the stress concentrates near the inner circumferential surface of the holding member. This reduces the maximum stress generated in the innermost layer of the holding member. As a result, the rotor may be advantageously operated at higher rotational speed, and the output of the electric motor can be increased.

(2) When the holding member has a multi-layer construction, the maximum stress generated in the holding member can be decreased, allowing the holding member to become thinner. As a result, a magnetic gap can be reduced, and the magnetic resistance in the magnetic circuit can be reduced. This increases an amount of magnetic flux, resulting in the increased torque with the same electric current. This also means that the electric motor can have the increased output at the same rotational speed. Therefore, the efficiency of the electric motor can be advantageously improved.

(3) When the interference of the tubular member provided on the radially inside is equal to or larger than that of the tubular member on the radially outside, the assembly process of the tubular members can be facilitated. Specifically, when the interference of each tubular member is designed in such a way, the differences in size between the tubular members can be increased, allowing the fitting process for fitting the tubular members with each other to be smoothly carried out. As a result, the manufacturing cost of the electric motor can be reduced.

(4) When the tubular member on the radially outside has a small interference, the amount of extension of the tubular member forming the outermost layer of the holding member in the circumferential direction can be reduced. Accordingly, even in the case of the tubular member formed by winding a sheet material, the terminal ends of the sheet material can be prevented from coming off when the tubular member extends. In addition, the fiber on the outer circumference side can be prevented from digging into the fibers on the inner circumference side. In this way, the durability of the rotor can be improved, and therefore the reliability of the electric motor can be improved. Alternatively, since the rotor can be operated at higher rotational speed due to the improved reliability, the output of the electric motor can be advantageously increased.

(5) When the tubular member provided on the radially inside has a large interference, the restorative force generated in the tubular member on the inner circumference side is increased, and the force for directly supporting the magnets against the centrifugal force during rotation can be increased. This also achieves the effect of increasing the maximum rotational speed of the rotor, and the output of the electric motor can be increased.

(6) When the holding member is formed from the tubular members having different mechanical properties, the tubular members can be arranged so as to have appropriate mechanical properties, depending on the positions in the radial direction. For example, the tubular member having high tensile strength may be provided on the inner circumference side where the stress tends to be great, and the tubular member having a property for protecting the rotor from the external force (for example, the property of anti-friction against air) may be provided on the outer circumference side, in order to prevent the rotor from being damaged. For example, since the innermost tubular member is in contact with the magnets, the innermost tubular member should have sufficiently high tensile strength not only in the circumferential direction but in any direction. Accordingly, when the innermost tubular member is made of a material having desired properties, the rotor can be prevented from being damaged, and the reliability of the electric motor can be improved.

In the case where the holding member is made of FRP, a tubular member on a radially inside may be more flexible, or in other words, configured to have a greater Izod impact value than a tubular member on a radially outside. This can prevent the rotor from being damaged.

(7) When the tubular member is made of FRP, the strength in any direction may be easily adjusted by adjusting the ratio of fibers extending in different directions from each other. When the tubular member is made of FRP containing a material with high specific strength, such as carbon fiber, glass fiber, aramid fiber, silicon carbide fiber, boron fiber, titanium alloy fiber, ultrahigh molecular weight polyethylene, and polybutylene terephthalate fiber, or the like, the centrifugal force acting on the tubular member can be reduced. As a result, most of the restorative force generated by the tubular member can be used to hold the magnets against the centrifugal force acting on the magnets. Therefore, the material having high specific strength is advantageously used to form the tubular member.

(8) It is advantageous that the tubular member having a circular shape in cross section can be easily shaped as necessary, and the internal structural defect is less likely to be generated. In addition, the manufacturing cost can be reduced.

Figure 2:
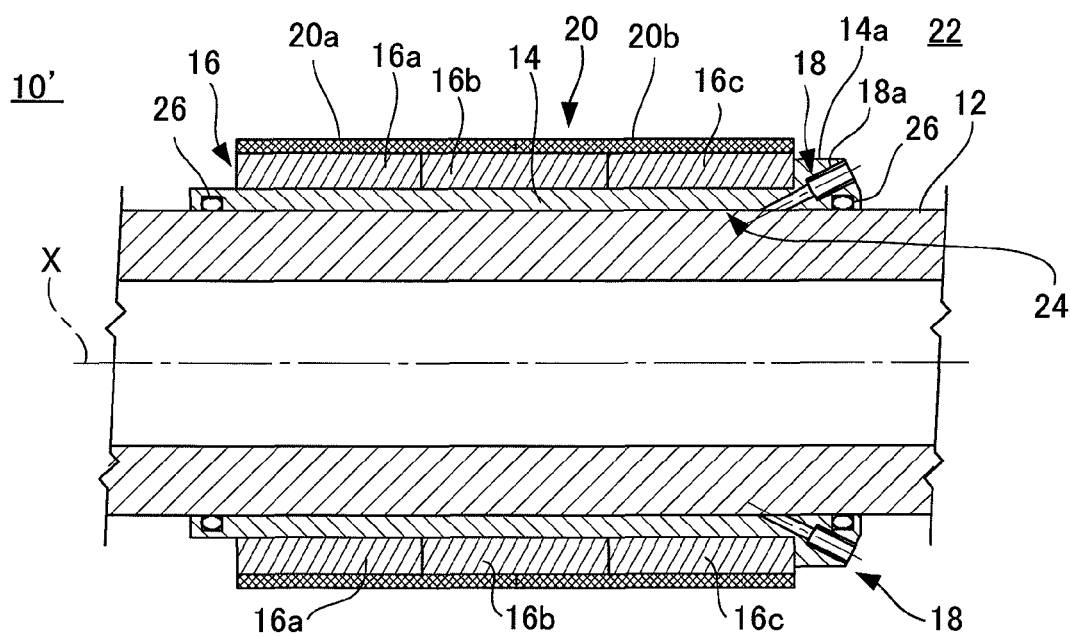
FIG. 2 is a cross-sectional view illustrating a rotor according to a variant.

FIG. 2 is a longitudinal section view illustrating a rotor 10' according to a variant of the rotor 10 shown in FIG. 1. In this variant, the magnet 16 is formed from three magnets 16a, 16b, and 16c arranged in the axially direction. On the other hand, the holding member 20 is formed from two holding members 20a and 20b. The other configurations of the rotor 10' are the same as the rotor 10.

The magnets 16a, 16b and 16c may have the same size or different sizes in the axial direction. For example, the sizes of the magnets 16a, 16b, and 16c in the axial direction may be 30 mm, 50 mm, and 40 mm, respectively. Similarly, the holding members 20a and 20b may have the same size or different sizes in the axial direction. Only one of the magnet 16 and the holding member 20 may have a discrete structure. As described above, the magnet 16 and the holding member 20 may have various discrete structures. In any case, the holding member 20 extends over the entire length of the outer circumference of the magnet 16 in the axial direction.

The magnet may also have a discrete structure in the circumferential direction. In this case, the magnet having a substantially circular arc shape may be arranged in the circumferential direction. The discrete magnets arranged in the circumferential direction can be prevented from being broken into pieces due to the compressive force acting on the magnets radially inwardly. In addition, the discrete magnets arranged in the circumferential direction can be easily increased in size, as compared to an integrally-formed cylindrical magnet, and therefore, the electric motor with a larger output can be advantageously realized.

Figure 3:
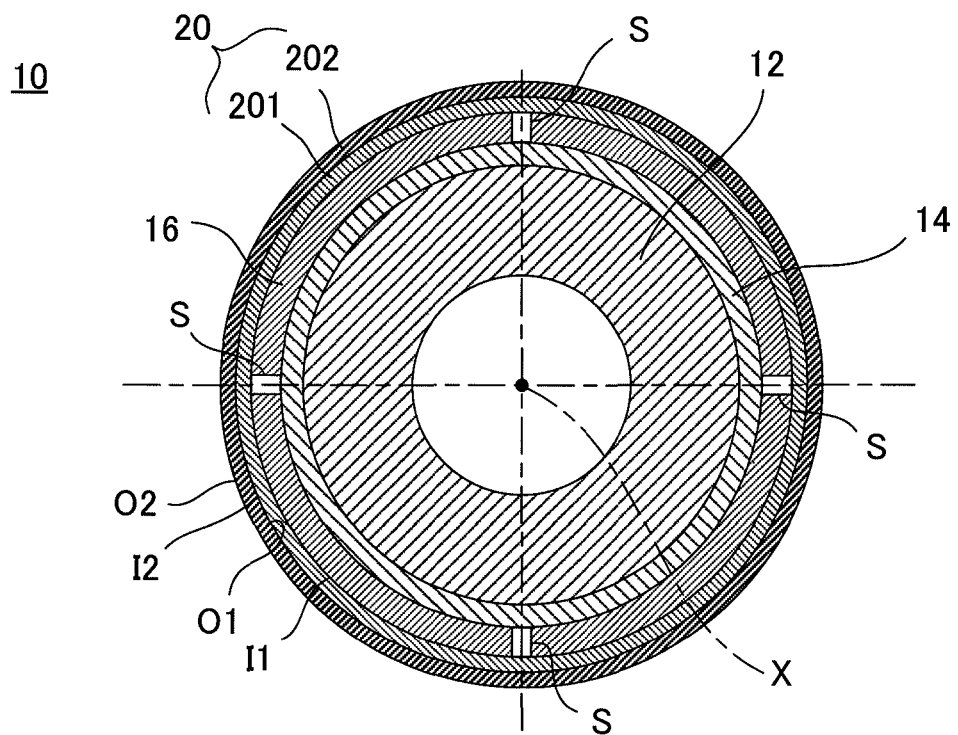
FIG. 3 is a cross-sectional view illustrating a rotor according to a first embodiment of the invention.

FIG. 3 is a cross sectional view illustrating a rotor 10 according to a first embodiment of the present invention. As illustrated, the holding member 20 includes a first tubular member 201 provided on the outer circumference of the magnet 16, and a second tubular member 202 provided on the outer circumference of the first tubular member 201. According to this embodiment, since the stress generated in the holding member 20 is distributed to the first tubular member 201 and the second tubular member 202, the maximum stress is reduced. In the illustrated embodiment, the magnet 16 includes four magnets arranged in the circumferential direction with a gap S between each other.

Figure 8:
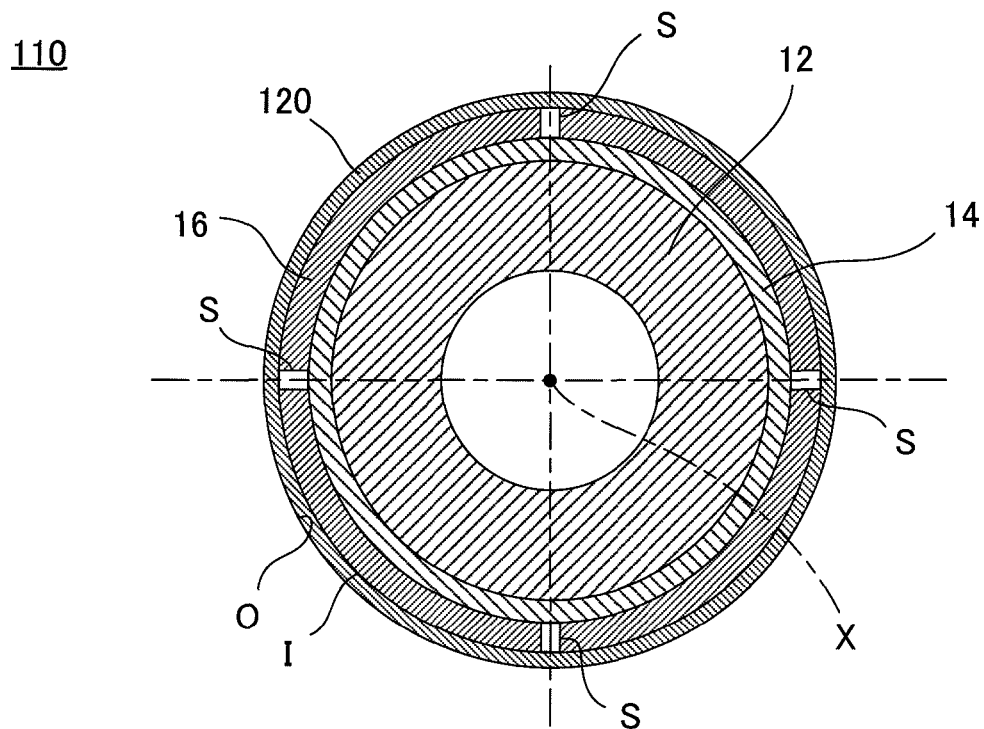
FIG. 8 is a cross-sectional view illustrating a rotor according to a comparative example.
Figure 9:
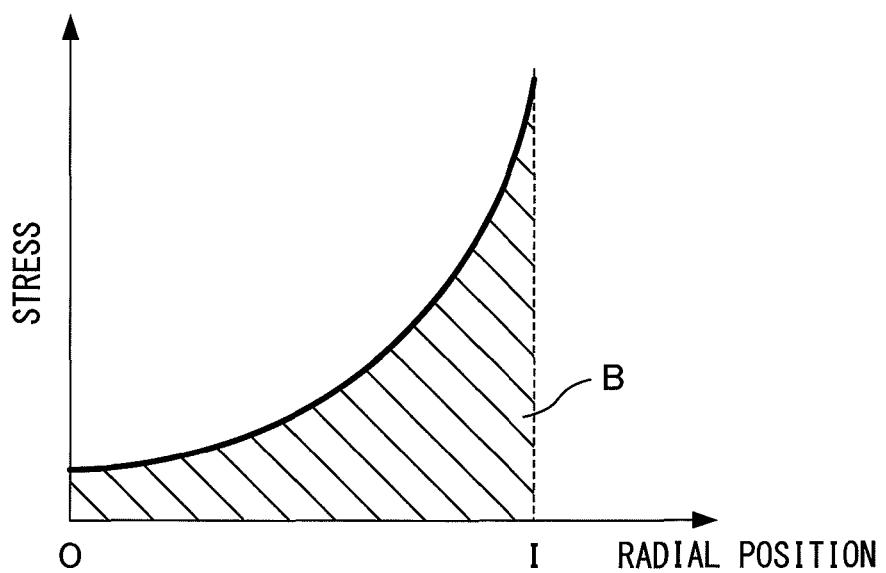
FIG. 9 is a diagram showing stress generated in a holding member of the rotor according to the comparative example.

FIG. 8 is a cross sectional view illustrating a rotor 110 according to a comparative example. The holding member in this comparative example only has one tubular member 120. FIG. 9 is a diagram of the stress generated in the holding member of the rotor 110. The horizontal axis of the diagram represents rotational positions of the holding member 20 from the outer circumferential face O to the inner circumferential face I of the tubular member 120. The vertical axis of the diagram represents the magnitude of the stress generated in the tubular member 120. As shown in FIG. 9, the stress is concentrically generated in a region near the inner circumferential face I of the tubular member 120.

Figure 4:
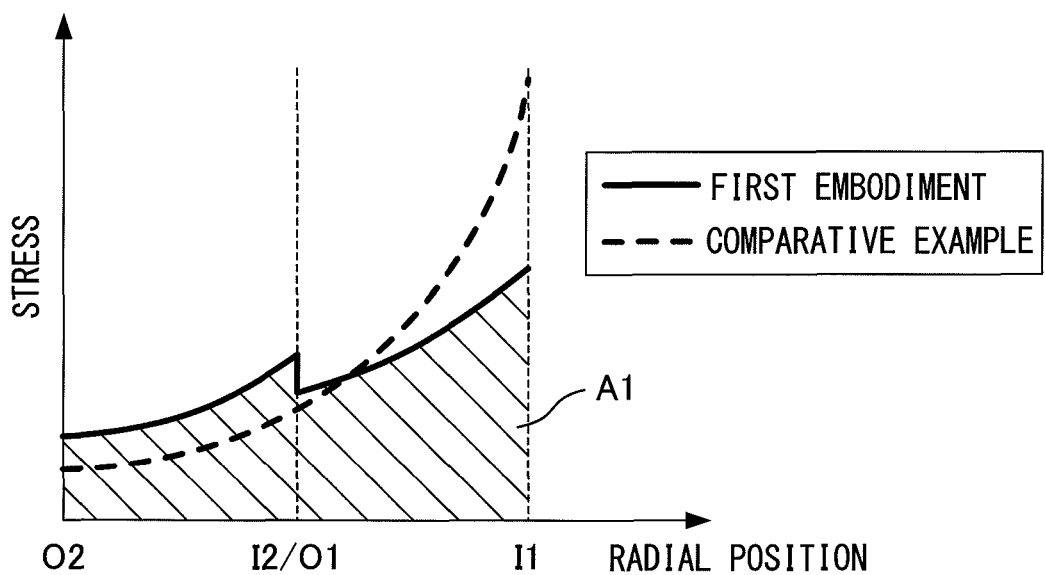
FIG. 4 is a diagram showing stress generated in a holding member of the rotor of FIG. 3.

FIG. 4 is a diagram of the stress generated in the holding member 20 of the rotor 10 shown in FIG. 3. The horizontal axis of the diagram represents radial positions from the outer circumferential face O2 to the inner circumferential face I2 of the second tubular member 202, and from the outer circumferential face O1 to the inner circumferential face I1 of the first tubular member 201. The vertical axis of the diagram represents the magnitude of the stress generated in the first tubular member 201 and the second tubular member 202, respectively. The dashed line in the diagram of FIG. 4 represents the stress generated in the comparative example shown in FIG. 9.

As shown in FIG. 4, the maximum stress generated in the holding member 20 in the first embodiment is smaller than that of the comparative example. In addition, the difference in the stress between the innermost position (the inner circumferential face I1 of the first tubular member 201) of the holding member 20 and the outermost position (the outer circumferential face O2 of the second tubular member 202) is also smaller. Accordingly, according to the first embodiment, the stress is distributed across the entire part of the holding member 20.

In the diagram shown in FIG. 4, the area defined between the curve showing a relationship between the radial position and the stress (stress curve) and the horizontal axis is proportionate to the tensile force acting on the tubular member in the circumferential direction. The tensile force in the circumferential direction is proportionate to the compressive force which presses the magnet radially inward. Therefore, when the area A1 defined by the stress curve and the horizontal axis in this embodiment is equal to the corresponding area B in the comparative example (see FIG. 9), the compressive force for holding the magnet substantially remains the same, and at the same time, the maximum stress generated in the tubular member can be reduced.

As shown in FIG. 4, even when the holding member is formed from a plurality of tubular members, relatively large stress is still generated in the tubular member on the radially inside. The innermost tubular member directly in contact with the magnet is subject to the stress concentration at contacting positions with the corners of the magnet, and the like. Accordingly, it is advantageous that the tubular member on the radially inside has the increased tensile strength, in particular. Although the tubular member with high tensile strength is generally expensive, when only one or some of the tubular members has the increased tensile strength, the cost increase can be minimized.

Figure 5:
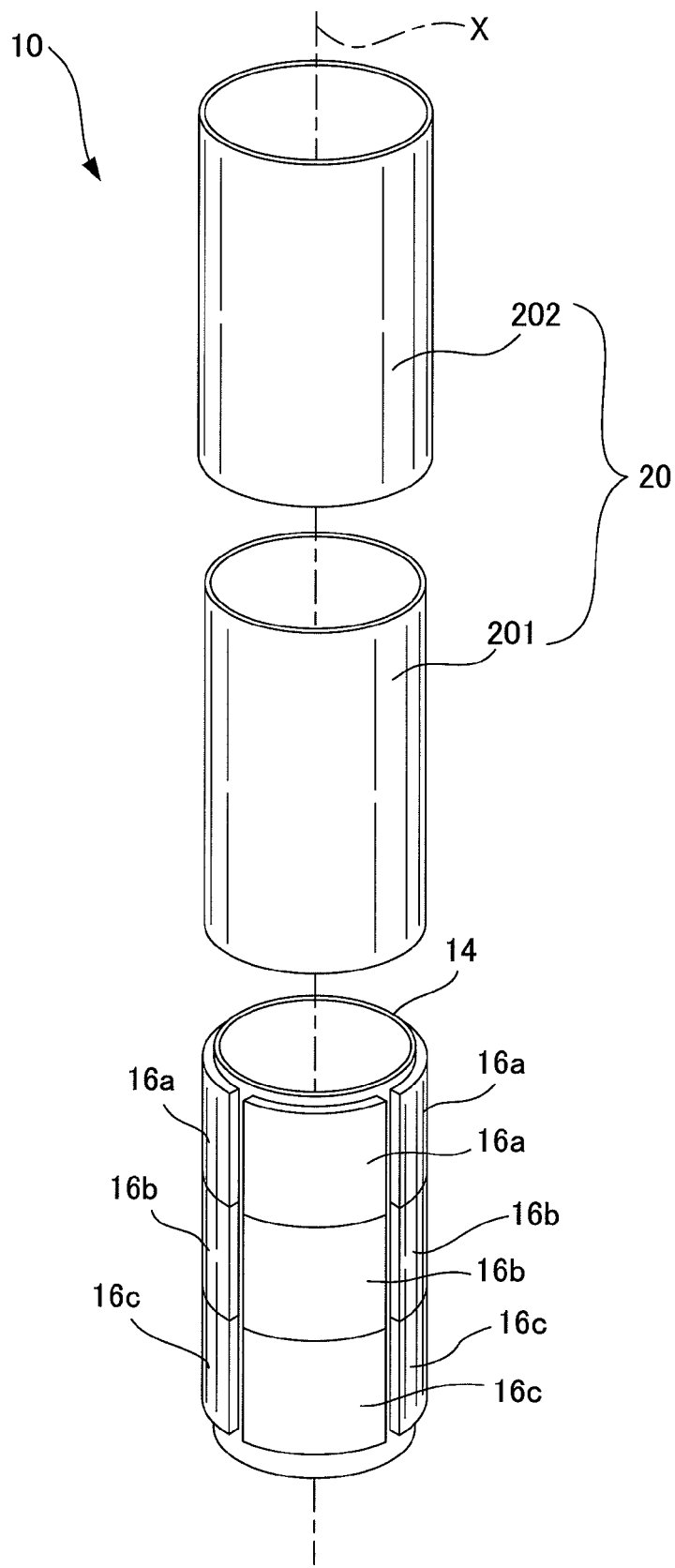
FIG. 5 is an exploded perspective view illustrating the rotor according to the first embodiment.

FIG. 5 is an exploded perspective view illustrating a rotor 10 according to one embodiment of the present invention. The rotor part including a sleeve 14 and magnets 16 is shown in FIG. 5 in the state prior to attachment to the rotational axis, which is not shown. In this embodiment, the magnets 16 are arranged on four arrays in the circumferential direction on the outer circumferential face of the sleeve 14, and each array includes three magnets 16a, 16b and 16c.

The first tubular member 201 and the second tubular member 202 forming the holding member 20 are successively attached to the rotor part. Alternatively, after the second tubular member 202 is attached to the outer circumference of the first tubular member 201, the inner circumferential face of the first tubular member 201 may be fitted to the outer circumferential face of the rotor part. It should be noted that in this embodiment, the order of the attachment of the respective parts is not limited.

Next, the exemplary configurations of the first tubular member 201 and the second tubular member 202 of the holding member 20 according to the first embodiment will be described.

EXAMPLE 1

The first tubular member 201 is made of FRP containing carbon fiber or glass fiber, which have a small elastic modulus and are relatively expensive. The fibers are wound multiple times so as to have a thickness sufficiently large that it can bear most of the force for holding the magnets. For example, the resin is also used as a binder, and hardened to form the first tubular member 201. Alternatively, a prepreg sheet is produced with the fibers, and then wound around a jig into a tubular form, and thereafter the resin is heated to harden to produce the tubular member 201. On the other hand, the second tubular member 202 is made of a material having relatively high tensile strength and a large elastic modulus, such as a carbon fiber.

The first tubular member 201 made of a material having a small elastic modulus in the circumferential direction is provided with a larger interference than the second tubular member 202. Before and after the attachment, the amount of expansion of the first tubular member 201 is larger than the amount of expansion of the second tubular member 202. Generally, when the tubular member is formed by winding a sheet material multiple times, there is an increased risk of the terminal end of the sheet material coming off, as the amount of expansion of the tubular member becomes greater. However, according to this embodiment, since the compressive force acts on the outer circumference of the first tubular member 201 from the second tubular member 202, so as to press the terminal end of the first tubular member 201, the terminal end can be prevented from coming off. Further, since the holding force for holding the magnet can be mostly realized by an inexpensive material, the overall cost can be reduced.

EXAMPLE 2

The first tubular member 201 is a tube made of a non-magnetic metal such as austenitic stainless steel or titanium or titanium alloy. This type of a metal tube generally has isotropy, having high strength in the axial direction as well as in the circumferential direction. When the first tubular member 201 on the innermost layer is made of this type of metal, the first tubular member 201 can be prevented from being damaged, even when coming in contact with a corner portion of the magnet or an irregular stepped portion of the magnet.

On the other hand, the second tubular member 202 is made of FRP containing carbon fiber, for example, with many fibers extending in the circumferential direction, so as to have a large elastic modulus in the circumferential direction. In this way, when the second tubular member 202 provided on the radially outside is made of a material having a large elastic modulus, great restorative force acts on the second tubular member 202, even though the second tubular member 202 has an interference smaller than the first tubular member 201. As a result, the holding force for holding the magnet can be increased. This allows the maximum rotational speed to be increased, and therefore the output of the electric motor can be increased.

Figure 6:
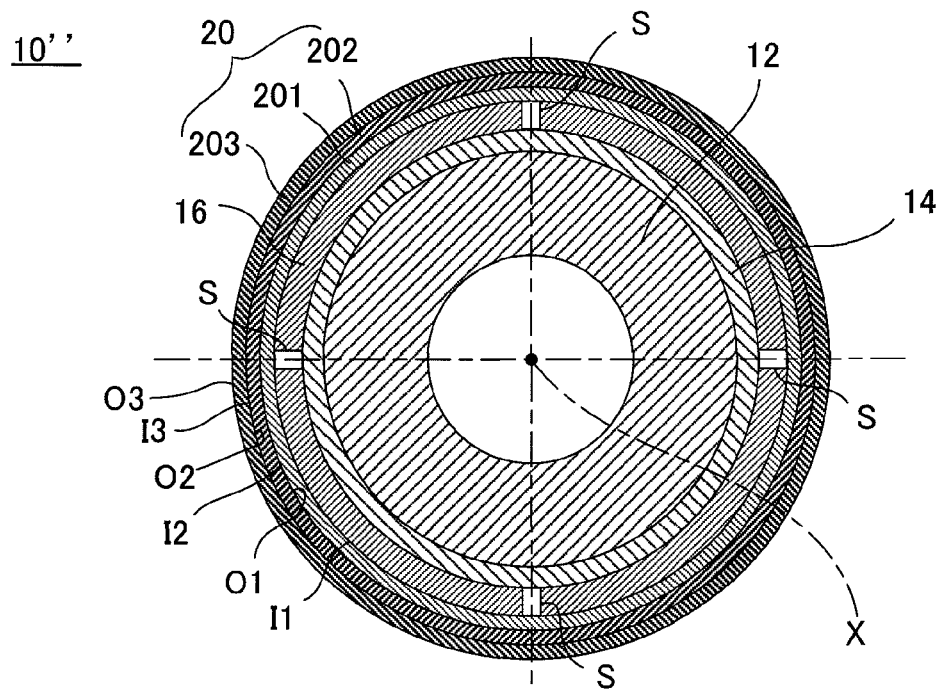
FIG. 6 is a cross-sectional view illustrating a rotor according to a second embodiment.

FIG. 6 is a cross sectional view illustrating a rotor 10" according to a second embodiment of the present invention. The rotor 10" in this embodiment includes a first tubular member 201 provided on the outer circumference of the magnet 16, a second tubular member 202 fitted onto the outer circumferential face O1 of the first tubular member 201, and a third tubular member 203 provided on the outer circumferential face O2 of the second tubular member 202.

Figure 7:
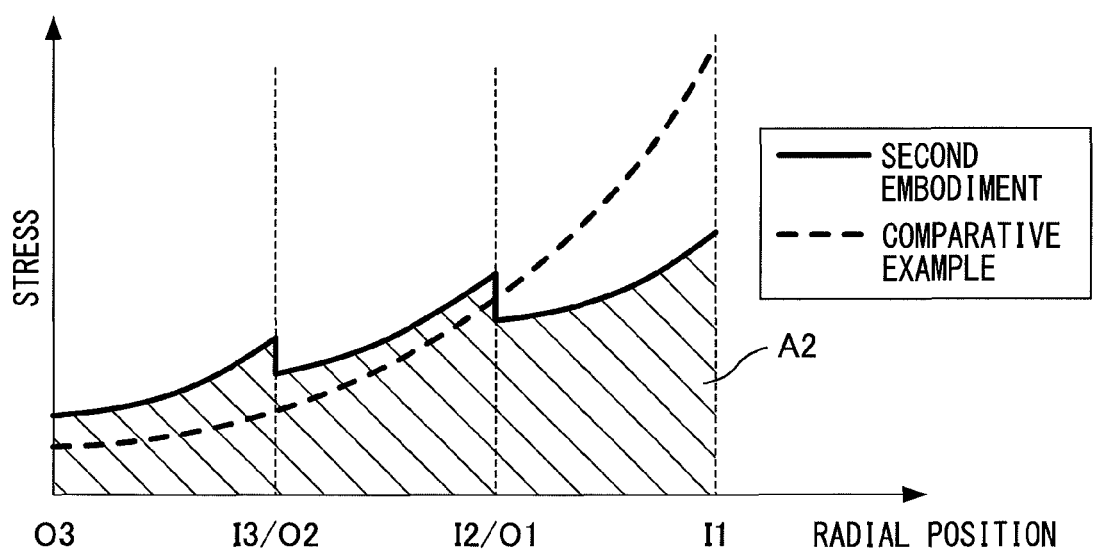
FIG. 7 is a diagram showing stress generated in a holding member of the rotor of FIG. 6.

FIG. 7 is a diagram showing the tendency of the stress distribution generated in the holding member 20 of the rotor shown in FIG. 5. The horizontal axis of the diagram represents radial positions from the outer circumferential face O3 to the inner circumferential face I3 of the third tubular member 203, from the outer circumferential face O2 to the inner circumferential face I2 of the second tubular member 202, and from the outer circumferential face O1 to the inner circumferential face I1 of the first tubular member 201. The vertical axis of the diagram represents the magnitude of the stress generated in the first tubular member 201, the second tubular member 202, and the third tubular member 203, respectively. The dashed line of the diagram in FIG. 7 represents the stress generated in the comparative example shown in FIG. 9.

As shown in FIG. 7, according to the holding member 20 including the three tubular members 201, 202 and 203, the maximum stress can be reduced as compared to the comparative example. When the holding member 20 has the same thickness, the respective tubular members 201, 202 and 203 have a thinner thickness than the first embodiment. In this way, when the holding member is formed from many tubular members, each tubular member can be thinner, and is easy to manufacture. In addition, a tubular member with a high quality, having no structural defect, or in other words, a tubular member with higher strength can be advantageously produced. Further, the yield rate can be increased, and as a result, the manufacturing cost can also be reduced. In addition, the thinner holding member results in the smaller magnetic gap, which contributes to the increased torque and improved efficiency of the electric motor, and therefore the performance of the electric motor can be improved. Furthermore, the thinner holding member allows the amount of material used for the holding member to be decreased, and the cost can be reduced.

For example, referring to the diagram of FIG. 7, when the area A2 defined by the stress curve and the horizontal axis in this embodiment is equal to the corresponding area B in the comparative example (see FIG. 9), the compressive holding force acting on the magnet in this embodiment is comparable to the comparative example, and at the same time, the maximum stress generated in the tubular members can be reduced.

The order of the assembly of the rotor 10" according to this embodiment is not limited in any specific manner as described with reference to FIG. 5. This also applies to the case where the holding member is formed from four or more tubular members.

Next, exemplary configurations of the first tubular member 201, the second tubular member 202 and the third tubular member 203 of the holding member 20 will be described.

EXAMPLE 3

The first tubular member 201 forming the innermost layer is made of FRP including glass fiber, carbon fiber with a small elastic modulus, or aramid fiber, for example. When the first tubular member 201 is made of a material having a great cushioning effect with great toughness, malleability, and ductility, the first tubular member 201 can be prevented from being damaged, even when the stress concentration occurs due to the uneven shape of the magnet.

The second tubular member 202 is made of a material having a larger elastic modulus than the first tubular member 201. The second tubular member 202 is, for example, made of carbon fiber with an elastic modulus larger than the first tubular member 201. The second tubular member 202 is provided with an interference comparable to that of the first tubular member 201. As a result, greater restorative force can be generated in the second tubular member than in the first tubular member. In this way, the second tubular member 202 can be designed to provide most of the holding effect for holding the magnet. In addition, since the second tubular member is interposed between the first tubular member 201 and the third tubular member 203, the stress concentration due to the outer shape of the magnet can be avoided, and there is no risk of the terminal end of the sheet material coming off. In order to take advantage of them, the second tubular member 202 is provided with a relatively larger interference and a relatively larger elastic modulus so as to provide most of the effect of holding the magnet. Further, taking into account the thickness in the radial direction, when the tubular member 202 is provided with relatively greater tensile force, the great holding force for holding the magnet can be provided.

The third tubular member 203 is made of a material having an elastic modulus equal to or greater than that of the second tubular member 202. When the third tubular member 203 on the outermost layer of the holding member is made of a material having a large elastic modulus, the third tubular member 203 can be provided with a relatively smaller interference, as compared to the inner tubular members. As a result, the sheet material being wound can be prevented from coming off at its terminal end. In addition, the fiber can be prevented from digging into the inner circumference side. Further, the productivity during assembly can be improved due to the larger gap for loose-fit. Furthermore, the third tubular member 203 can somewhat provide the holding force for holding the magnet. The third tubular member 203 may be made of FRP, or non-magnetic metal such as titanium alloy.

EXAMPLE 4

The first tubular member 201 and the second tubular member 202 are made of materials having elastic moduli comparable to each other. The first tubular member 201 and the second tubular member 202 may be made of the same material. Even when the tubular members are made of the same material, the stress is distributed to the tubular members, and therefore, the maximum stress can be reduced, which is advantageous as described below. Since the respective tubular members become thinner, the tubular member can be easily formed from the sheet like material, and the property such as the tensile strength or durability can be improved. In addition, since the yield rate is improved, the manufacturing cost can be reduced. The thinner holding member also results in the smaller magnetic gap, improving the torque and efficiency of the electric motor, and therefore the performance of the electric motor can be improved. The thinner holding member is also advantageous that since the amount of material used for the holding member can be decreased, the cost can be reduced. Further, since the maximum stress can be reduced, the maximum rotational speed may be increased.

On the other hand, the third tubular member 203 is made of a material having a relatively large elastic modulus. The third tubular member 203 is provided with a small interference. Even though the interference is small, since the third tubular member 203 has a relatively large elastic modulus, sufficiently great restorative force is generated in the third tubular member 203. Accordingly, the terminal end of the sheet material being wound to form the second tubular member 202 can be prevented from coming off, by the compressive force from the third tubular member 203. In addition, since the third tubular member 203 has a small interference, the terminal end of the sheet material being wound to form the third tubular member 203 can be prevented from coming off.

In the case where at least first and second tubular members 201 and 202 are made of FRP in which fibers extend in a circumferential direction, matrix fiber of FRP of the first tubular member 201 may be configured to have a greater Izod impact value than matrix fiber of FRP of the second tubular member 202. According to this configuration, the holding member 20 can be prevented from being damaged. For example, the first tubular member 201 may include acrylic resin as matrix resin and the second tubular member 202 may include epoxy resin as matrix resin. Alternatively, both of the first and second tubular members 201 and 202 may include epoxy resin as matrix resin, and the respective materials of the first and second tubular members 201 and 202 may be selected such that the glass transition temperature of the matrix resin of the first tubular member 201 is lower than that of the matrix resin of the second tubular member 202. This allows the rotor having high resistance to breakage or operable at higher speed to be provided.

EXAMPLE 5

The first tubular member 201 is a thin tube made of non-magnetic metal. Therefore, even in the case where the magnet has a rough surface and the stress concentration tends to occur at a portion contacting with the magnet, the first tubular member can be prevented from being damaged.

The second tubular member 202 is made of FRP, for example. The second tubular member is made of a material having an elastic modulus larger than that of the first tubular member in the circumferential direction and an interference equal to or somewhat smaller than the first tubular member. Since the first tubular member is a metal tube, there is no risk of the fiber of the second tubular member digging into the first tubular member. Thus, the second tubular member can be provided with an interference comparable to that of the first tubular member. As a result, the second tubular member may be designed to provide most of the holding force for holding the magnet. On the other hand, the third tubular member 203 is made of a material having an elastic modulus larger than the second tubular member 202, for example, made of FRP. The third tubular member 203 is provided with an interference smaller than those of the first tubular member and the second tubular member. As a result, the fibers of the second tubular member 202 can be prevented from coming off or getting loose. In addition, since the third tubular member 203 has a small interference, the terminal end of the sheet material of the third tubular member can be prevented from coming off.

Examples of the interferences will be described when the holding member includes three tubular members.

For simplicity, the case in which an imaginary line connecting the contours of the magnets has a circular shape will be considered. In the case where the imaginary line does not have a circular shape, the same explanation will apply based on an imaginary circle in which an equivalent diameter of the circle is replaced with a circumferential length of the magnets.

The outer diameter of the magnets prior to the attachment to the rotational axis is 80 mm. The sizes of the first tubular member 201, the second tubular member 202, and the third tubular member 203 are as follows:

the first tubular member: the inner diameter is 80.1 mm, the thickness is 0.5 mm, and the outer diameter is 81.1 mm;

the second tubular member: the inner diameter is 81.2 mm, the thickness is 0.5 mm, and the outer diameter is 82.2 mm; and the third tubular member: the inner diameter is 82.4 mm, the thickness is 0.5 mm, and the outer diameter is 83.4 mm.

In this case, since the inner diameter of the second tubular member 202 is larger than the outer diameter of the first tubular 201, the fitting between them is loose-fit with the interference of 0.1 mm. Since the inner diameter of the third tubular member 203 is larger than the outer diameter of the second tubular member 202, the fitting between them is loose-fit with the interference of 0.2 mm. Accordingly, the tubular members 201, 202, and 203 can be easily assembled.

In this example, the interference is set to 0.6 mm, or in other words, the magnet is attached to the rotational axis by interference fit such that the outer diameter of the magnet is increased to 80.6 mm. The interference fit may be carried out with the aid of oil pressure or a tapered shape.

In the case of the interference of the magnet being set to 0.6 mm, the sizes of the tubular members 201, 202 and 203 are as follows (the changes in thickness is small enough to be disregarded):

the first tubular member: the inner diameter is 80.6 mm, and the outer diameter is 81.6 mm;

the second tubular member: the inner diameter is 81.6 mm, and the outer diameter is 82.6 mm; and the third tubular member: the inner diameter is 82.6 mm, and the outer diameter is 83.6 mm.

Accordingly, the interferences of the first tubular member 201, and of the second tubular member 202, and of the third tubular member 203 are 0.5 mm, 0.4 mm, and 0.2 mm, respectively.

According to this embodiment, the tubular members 201, 202 and 203 are assembled with each other by loose-fit, and therefore the productivity is improved. On the other hand, the second tubular member 202 has a relatively large interference. Thus, when the second tubular member 202 is made of a material having a relatively large elastic modulus, most of the holding force for holding the magnet can be provided by the second tubular member 202.

In the embodiments of the present invention, a film may be interposed between the respective tubular members, or between the tubular member and the outer circumferential face of the magnet, so as to increase the holding force for holding the magnet. The film may also have the effect of increasing the tightness between the members contacting with each other. Alternatively, in order to improve the productivity during the fitting process, a film or lubricant may be used between the members.

Effect of the Invention

According to the present invention, the magnets of the rotor are held by a plurality of tubular members provided concentrically with the rotor. Thus, the stress, which otherwise tends to concentrate on the inner circumference of the holding member, is distributed to the respective tubular members, and therefore the maximum stress generated in these tubular members can be reduced. The maximum rotational speed of the rotor can be increased without impairing the reliability of the rotor. As a result, the output of the electric motor can be increased.

Although the various embodiments and modifications of the present invention have been described above, it is apparent to those skilled in the art that other embodiments and modifications may also provide the functions and effects intended by the present invention. Particularly, one or more of the constituent elements of the embodiments and modifications described above may be omitted or replaced or any known means may further be added, without departing from the scope of the present invention. Additionally, it is apparent to those skilled in the art that the invention may also be performed by any combination of the features of the different embodiments explicitly or implicitly disclosed in the present specification.

The invention claimed is:

1. A rotor of an electric motor comprising a plurality of magnets arranged in a circumferential direction,
the rotor further comprising a holding member provided concentrically with the rotor on a radially outside of the plurality of magnets so as to hold the plurality of magnets,
the holding member including a plurality of tubular members arranged concentrically with one another and having diameters different from one another, the respective tubular members having expanded diameters such that compressive holding force acts on the magnets radially inwardly, as a result of elastic restorative force of the holding member,
wherein any two tubular members of the plurality of tubular members which are adjacent to each other in a radial direction are configured such that one of the two tubular members has an interference larger than that of the other tubular member situated on a radially outside.

2. The rotor according to claim 1, wherein any two tubular members of the plurality of tubular members which are adjacent to each other in a radial direction are configured such that one of the two tubular members has an elastic modulus smaller than that of the other tubular member situated on a radially outside.

3. The rotor according to claim 1, wherein the plurality of tubular members includes carbon fiber-reinforced resin configured such that carbon fiber at least extends in a circumferential direction, and
wherein a tubular member of the plurality of tubular members which is situated on an innermost position in a radial direction has tensile strength higher than any other tubular members.

4. The rotor according to claim 1, wherein at least two of the plurality of tubular members are made of fiber-reinforced resin in which fibers extend in a circumferential direction, the tubular members being arranged such that matrix resin of the fiber-reinforced resin of the tubular member on a radially inside has a greater Izod impact value than that of the tubular member on a radially outside.

5. The rotor according to claim 1, wherein a tubular member of the plurality of tubular members which is situated on an outermost position in a radial direction has a cylindrical shape prior to assembly, and
wherein the others of the plurality of tubular members have a non-cylindrical shape.

6. An electric motor comprising the rotor according to claim 1.

* * * * *